Dec. 17, 1963  A. BLAAUW  3,114,230
DOUBLE SICKLE BAR MOWER
Filed May 10, 1961

INVENTOR.
ANDREW BLAAUW
BY
WILSON, SETTLE & CRAIG
ATTORNEYS 3,114,230
DOUBLE SICKLE BAR MOWER
Andrew Blaauw, 114 S. Prairie Ave., Bloomingdale, Ill.
Filed May 10, 1961, Ser. No. 109,169
6 Claims. (Cl. 56—297)

This invention relates to a reciprocable sickle bar mower of the agricultural type and more particularly to a mower having a pair of reciprocable sickle bars cooperating to provide an improved scissor-like cutting action by the teeth thereof.

Agricultural mowers of the reciprocable sickle bar type usually comprise a single sickle bar with the blades thereof working against fixed foliage engaging elements to provide a cutting action. However, in particularly heavy foliage such as particularly heavy and lush hay crops, a single reciprocable sickle bar does not provide a sufficiently vigorous cutting action and either becomes jammed or fails to cut the crop completely. The consequences are obvious and the result is that heavy crops cannot be satisfactorily harvested with such equipment.

Accordingly mowers of the double sickle bar type have been devised for such heavy cutting, but have generally been deficient because of clogging of the sickle bar teeth due to adhesion of plant juices and fragments thereto. Accordingly a step forward in the art would be provided if the clogging tendency of double sickle bar mowers could be overcome.

Accordingly it is an important object of the present invention to provide an improved agricultural mower of the reciprocable, double sickle bar type.

A further object is to provide an agricultural mower of the reciprocable, double sickle bar type of improved cutting action and anti-clogging characteristics.

A still further object is to provide an agricultural mower utilizing two reciprocable, bladed sickle bars wherein the teeth of the blades are resiliently biased into improved, slidable cutting relationship.

Another object is to provide an agricultural mower utilizing two reciprocable bladed sickle bars wherein the teeth of the sickle bars are maintained in transversely inclined relation by spacer elements interposed between the sickle bars, the inclined teeth being resiliently biased into improved, slidable, scissor-like cutting relationship.

A further object is to provide an improved mower construction of the type utilizing a pair of superimposed sickle bars each bearing teeth and each being driven for cooperative reciprocation with the other, characterized by the sickle bars being longitudinally parallel but having the teeth thereof inclined transversely relative to one another in acute angularity, so that the cutting edges of the teeth of one bar contact the cutting edges of the teeth of the other bar with the bars diverging from one another rearwardly of the teeth, the teeth being biased into slidable scissor-like cutting relationship with respect to each other.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
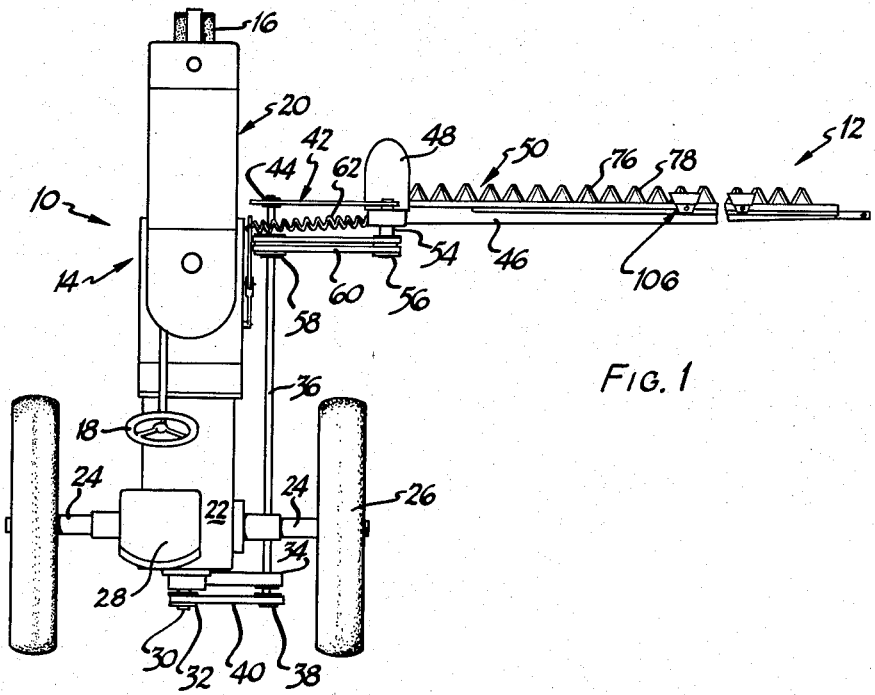
FIGURE 1 is a plan view of an agricultural tractor having an improved mower of the present invention attached thereto in operable relationship.

In FIGURE 1 there is illustrated a farm tractor 10 having an improved mower 12 of the present invention of the reciprocable, double sickle bar type attached thereto in operative relationship. The tractor 10 includes a frame 14 supported at its front end by rotatable and steerable wheels 16 which are adapted to be guided by a steering wheel 18 located at a median point on the tractor frame 14 for reasons to be brought forth hereinafter. An engine 20 is carried at the forward end of the frame 14 for driving the tractor 10 and attachments such as the mower 12 shown, through appropriate gearing. At the rear end of the frame 14 there is provided a differential and rear axle housing 22 containing a driving gear assembly (not shown) operably connected to the engine 20.

The rear axle housing 22 is adapted to rotatably support rear axles 24 in driving relationship to the drive gear assembly previously mentioned, as contained in the rear axle housing 22; and the rear axles 24 support rear driving wheels 26 at their outer ends for propelling the tractor 10 in a forward or rearward motion as desired.

A seat 28 is supported above the rear axle housing 22 and is positioned adjacent the aforementioned steering wheel 18 whereby an operator can sit and reach the steering wheel and other controls for running the tractor 10.

The rear axle housing 22 has a power take-off shaft 30 extending rearwardly therefrom and such shaft is provided with a power take-off pulley 32 thereon. A support bracket 34 is also carried by the rear axle housing 22 and is journaled (not shown) at its outer end for the receipt of one end of an elongated driving shaft 36. The rear end of the drive shaft 36 extends through the aforementioned journal and its exposed end is fitted with a pulley 38 in aligned relationship to the power take-off pulley 32 carried by the power take-off shaft 30. The pulleys 38 and 32 are operably connected by means of a flexible belt 40. A mower support bracket 42 is adapted to be supported at the front of the tractor frame 14 by means, not shown. The bracket 42 supports a bearing 44 which in turn supports the front end of the drive shaft 36.

*The Mower Structure*

The mower 12 is carried by the support bracket 42 for pivotal movement so that it can be moved from a ground-engageable, crop-cutting position to a raised, inoperable transport position.

The mower includes an elongated support arm 46 with a drive housing 48 on the inner end thereof. The drive housing 48 is pivotally connected to the outer end of the mower support bracket 42 to thereby support the entire mower 12 for the previously mentioned pivotal movement. The drive housing 48 contains a double rocker arm inter-connected to a crank shaft arrangement (not shown) for reciprocably moving upper and lower sickle bars 50 and 52, FIGURE 3, to be described later, which are operably mounted on the mower support arm 46. The drive mechanism is effective to reciprocate sickle bars 50 and 52 with respect to one another a distance equal to at least the width of one of the teeth at the base. A power receiving shaft 54 extends from the rear end of the drive housing 48 and is provided with a pair of V pulleys 56. The previously mentioned, elongated drive shaft 36 is provided adjacent its forward end with a pair of V pulleys 58 located in aligned relationship to the V pulleys 56 on the power receiving shaft 54 and belts 60 extend between V pulleys 56 and 58 in power transmitting relationship. Accordingly a power train is established from the tractor power takeoff shaft 30 to the mower 12 for driving the same.

A spring 62 extends from the tractor frame 14 to the support arm 46 to aid in floatably supporting the support arm or cutter bar 46 of the mower 12.

Figure 2:
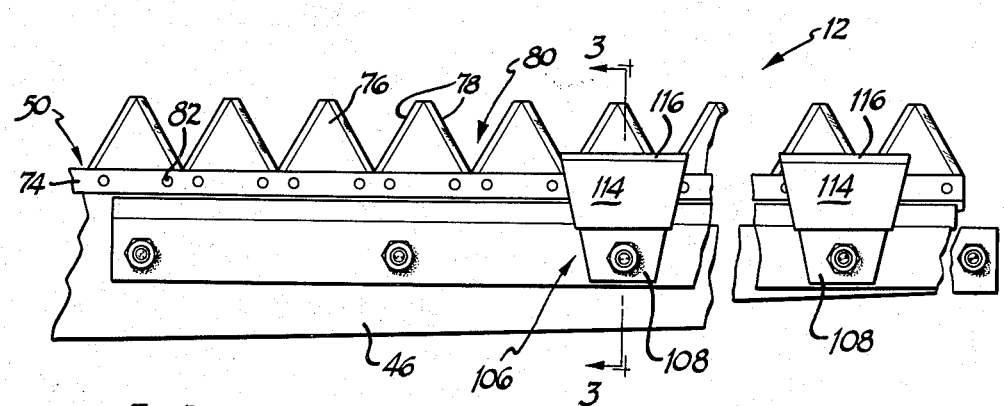
FIGURE 2 is an enlarged fragmentary plan view of a section of the mower of FIGURE 1, illustrating the improved spring biasing brackets of the invention attached thereto.
Figure 3:
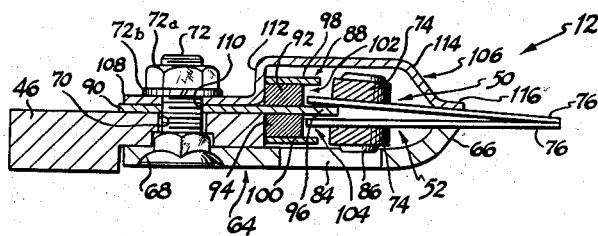
FIGURE 3 is a section view taken along the line 3—3 of FIGURE 2.

As better shown in FIGURE 2, the mower 12, as previously mentioned, includes an elongated support arm 46 of generally flattened rectangular configuration in cross section as shown in FIGURE 3. Along the lower front edge of the support arm 46 there is secured a lower sickle bar support 64 of flattened plate-like configuration which curves upwardly at its forward edge to provide a support lip 66 to slidably support the lower sickle bar assembly 52. The lower sickle bar support 64 is provided adjacent its rear edge with spaced chamfered openings 68 and aligned holes 70 are provided in the mower support arm 46 for passage of bolts 72 therethrough to retain the sickle bar support 64 operably connected to the mower support arm 46. Nuts 72a and lock washers 72b retain the bolts in secured position.

As shown in FIGURES 2 and 3, each of the sickle bars 50 and 52 is fabricated as an elongated runner or bar 74 having a plurality of triangular teeth 76 having outwardly convergent cutting edges 78 defining inwardly convergent notches 80 between the teeth. The teeth 76 are secured to the runners 74 by rivets 82 or by other suitable equivalent fastening means. The sickle bars 50 and 52 provide a substantially flat side and have the cutting edges of their teeth disposed in a common plane. When the teeth 76 are mounted by means of rivets, the rivets may be countersunk so as to avoid protrusion from the flat sides.

As shown in FIGURE 3, the lower sickle bar support 64 is provided with an elongated opening 84 to provide clearance for the downwardly extending rivet heads 86 holding the teeth 76 to the cutter bar 74, during reciprocation of cutter bar.

As further shown in FIGURE 3, the mower support arm 46 is provided along its upper front edge with a sickle bar spacer assembly or separator element 88 which includes a central spacer plate 90 having bars 92 and 94 fastened to its upper and lower sides adjacent the front edge, but spaced rearwardly from the front edge a short distance to provide an upper and lower sickle bar separating lip 96. Along the upper side of the top channel bar 92 and lower side of the lower channel bar 94 there are respectively secured channel-forming plates 98 and 100 with their front edges extended beyond the forward edges of the channel bars 92 and 94. Thus upper and lower U-shaped channels 102 and 104 are provided to receive the rear portion of the sickle bars 50 and 52 so that the teeth of the respective upper and lower sickle bars are disposed in acute angularity with respect to one another and extended relationship beyond the foremost edge of the mower support arm 46, i.e. beyond the support lip 66 of the lower sickle bar support 64.

The previously mentioned bolts 72 pass through the mower support arm 46 for holding the lower sickle bar support 64 in position; these bolts also pass through an aperture formed in the rear portion of the central spacer plate 90 of the spacer assembly 88 to retain it in operable relationship adjacent the front edge of the support arm 46.

As is further shown in FIGURES 1, 2 and 3, the novel mower 12 of this invention includes a plurality of spring bracket hold down elements or arms 106. These include a rear body portion 108 of generally rectangular configuration as seen in FIGURE 2 and having apertures 110 therein (FIGURE 3) receiving the previously mentioned bolt 72 adapted to hold the lower sickle bar support 64 and the central plate 90 in the sickle bar spacer assembly 88 in operable relationship with each other, all supported in operable position on the mower support arm 46.

Adjacent the forward edge of the body portions 108, the spring bracket elements are bent upwardly at a 90° angle to provide an upstanding shoulder 112 adapted to abut the back side of the channel bar 92 of the spacer assembly 88. The spring bracket elements are then bent forwardly in a horizontal plane at a 90° angle to provide a forwardly extending median body portion 114 extending in non-engaging relationship above and out over the upper sickle bar 50. At the forward edge of the median body portion 114, the spring bracket elements 106 are then bent downwardly at an obtuse angle and then outwardly to form cutter engaging lips 116. These cutter-engaging lips 116 are positioned vertically above the support lip 66 of the lower sickle bar support 64. Thus the spring bracket elements 106 are adapted to be fastened at their rear edges to the support arm 46 of the mower 12 and extend out over the sickle bar spacer assembly 88 and upper sickle bar 50 in non-engaging relationship to provide a clearance space freely receiving the upper sickle bar 50, and out into resiliently engaging relationship with the upper surfaces of the teeth 76 of the upper sickle bar 50.

In summary it will be seen that the spring bracket hold-down elements are of generally inverted U-shaped configuration, with an outwardly extended attachment flange on one of the arms and with an outwardly extending cutter engaging lip 116 on the other of the arms.

The spring bracket elements 106 are fabricated of resilient material such as spring steel or the like and accordingly are adapted to resiliently bias the teeth 76 of the upper sickle bar 50 into slidable cutting relationship with the teeth of the lower sickle bar 62.

*Operation*

The operation of the mower with the novel teeth-engaging sickle bars of the present invention is as follows.

The tractor, with a mower mounted thereon is positioned with the mower assembly in horizontal, crop-engageable relationship and the tractor is driven parallel to the swath to be mowed. The power take-off driving assembly is actuated to reciprocate the two sickle bars in opposite reciprocable motion with the teeth moving into and out of overlapping relationship to provide a scissor-like cutting action. The degree of overlap between the teeth is optional and may extend from a configuration where one tooth of one sickle bar overlaps from one up to as high as three teeth of the other sickle bar.

As the sickle bars are moved in reciprocable relationship, the cutting edges of the teeth are in continuous shearing engagement by virtue of the pressure exerted against the upper surfaces of the teeth of the upper cutter bar, and the points of contact continuously progress as the teeth of one bar traverse the teeth and notches of the other bar. This causes the sickle bars 50 and 52 to move vertically toward and away from each other with a unique, vertical pumping action. This pumping action is aided by the U-shaped channels 102 and 104 which loosely receive the rear portions of the sickle bars 50 and 52 and permit the unique vertical sickle bar movement.

Further, the bars 92 and 94 of the U-shaped channels 102 and 104 provide a bearing strip for the rear edge of the knife section to counteract the horizontal force imposed on the section from the forward or shear motion into the foliage. This removes the horizontal forces from the rivets and tends to reduce loosing of the knife sections upon impact from horizontal loads. Also, the biasing action of the spring bracket elements 106, keeps the teeth of the upper sickle bar pressed into the aforementioned slidable shearing relationship with the teeth of the lower sickle bar to facilitate the aforementioned pumping action.

Accordingly, encountered material to be severed is received between the cutting edges of the teeth at the front of the sickle bar and the material is quickly and cleanly sheared.

With the sickle bars spaced at all points by the sickle bar spacer assembly 88, as shown in FIGURE 3, except for their contacting cutting edges, a clearance space between the cutting bars is at all times assured; this space enlarges and decreases in the aforementioned pulsing pumping action whereby any debris or juices that work their way between the teeth are thrown out to be exhausted through the openings 84 in the lower sickle bar support element 64. Thus clogging is obviated.

Conventional single sickle bar mowers often clog in heavy hay crops and require periodic cleaning. In contrast, the double sickle bar mower of the present invention is not clogged when either cutting a standing crop or when being drawn through previously cut hay lying on the ground. Additionally there is no accumulation of plant juices or debris between the sickle bars of the present invention which in any way will interfere with their efficient operation. The cutting action is effected at the contact points between the teeth of the upper and lower sickle bars and accordingly the cutting is kept out in front of the sickle bars. Thus little if any debris is permitted to enter between the bars because of the pumping action of the teeth and they are retained in a free and clear condition.

It has been found that the mower of the present invention operates much more effectively than either conventional single sickle bar assemblies or previously known double sickle bar assemblies and because of the self-sharpening effect which the teeth have on each other, down time for sharpening and maintenance is substantially reduced. Further, greatly improved cutting is provided.

As illustrated in FIGURE 3 the sickle bars are spaced apart at their heels with the result that the teeth engage only at their cutting edges. This provides a self-cleaning function and dirt, gums, fluids and so forth are free to pass clear of the teeth and there is no close clearance to cause materials to accumulate and urge the cutting teeth apart and cause clogging or jamming.

Having thus described my invention, I claim:

1. In an agricultural mower having a mower arm and upper and lower sickle bars positioned in axially aligned, superimposed relation thereon, said sickle bars having teeth extending from the front edges thereof with the cutting edges of the teeth in a common plane, said sickle bars being disposed for cooperative reciprocable movement, the improvements comprising a separator element adapted to separate said cutter bars at their rear edges, said separator element including adjacent and parallel upper and lower channels adapted to slidably receive the rear edges of said sickle bars in spaced array, and means biasing the teeth of said sickle bars into acute angular resilient, slidable, scissor-like cutting relation.

2. In an agricultural mower having a mower arm and upper and lower sickle bars positioned in axially aligned, superimposed relation thereon, said sickle bars having teeth extending from the front edges thereof with the cutting edges of the teeth in a common plane, said sickle bars being disposed for cooperative reciprocable movement to provide a scissor-like cutting action by the teeth thereof, the improvements comprising a separator element adapted to separate said cutter bars at their rear edges, said separator element including adjacent and parallel upper and lower U-shaped channels adapted to slidably receive the rear edges of said cutter bars in spaced array, a lower cutter bar support member secured to the mower arm and having a support lip extended outwardly beyond the U-shaped channels of said separator element, said lip being adapted to slidably support the lower surfaces of the teeth of said lower cutter bar, and resilient means fastened to said mower arm to overlie said upper cutter bar in resilient, slidable, contacting relationship with the upper surface of the teeth thereof to bias said teeth into acute angular resilient, slidable, scissor-like cutting engagement with the teeth of said lower cutter bar.

3. In an agricultural mower having a mower arm and upper and lower sickle bars positioned in axially aligned, superimposed operable relation thereon, said sickle bars having teeth extending from the front edges thereof with the cutting edges of the teeth in a common plane, said sickle bars being disposed for cooperative reciprocable movement to provide a scissor-like cutting action by the cutting edges of the teeth thereof, the improvements comprising a separator element adapted to separate said cutter bars at their rear edges, said separator element including an elongated plate having elongated upper and lower bars fastened to its upper and lower sides adjacent the front edge, said bars being spaced rearwardly from said front edge a short distance to provide an upper and lower sickle bar separating lip, means on the opposite exposed sides of said bars cooperating with said separating lip to form adjacent and parallel upper and lower U-shaped channels to slidably receive the rear edges of said sickle bars in spaced array, a lower cutter bar support member secured to the mower arm and having a support lip extended outwardly beyond the U-shaped channels of said separator element, said lip being adapted to slidably support the lower surfaces of the teeth of said lower cutter bar, and resilient means fastened to said mower arm to overlie said upper cutter bar in resilient, slidable, contacting relationship with the upper surfaces of the teeth thereof to bias said teeth into acute angular resilient, slidable, scissor-like cutting relation with the teeth of said lower cutter bar.

4. In an agricultural mower having a mower arm and upper and lower sickle bars positioned in aligned, superimposed relation thereon, said sickle bars having teeth extending from the front edges thereof with the cutting edges of the teeth of each sickle bar in a common plane, said sickle bars being disposed for cooperative reciprocable movement, the improvement comprising a separator element for said sickle bars and adapted to separate said sickle bars at their rear edges, said separator element including adjacent and parallel upper and lower channels adapted to slidably receive said sickle bars in spaced array, bearing surfaces in each of said upper and lower channels engageable with the rear edges of each of said sickle bars to counteract forces imposed on said sickle bars from forward motion of the mower arm into foliage, and means biasing the teeth of said sickle bars into acute angular resilient, slidable, scissor-like cutting relation.

5. In an agricultural mower including a mower arm carrying a pair of sickle bars having teeth adapted for reciprocable, scissor-like cutting action, the improvement comprising
a separator element connected to the mower arm and loosely supporting said sickle bars in spaced relation at their rear edges, and means biasing the teeth of the bars into resiliently contacting relation, whereby movement of the teeth over each other causes the sickle bars to move toward and away from one another with a pumping action which is effective to expel debris from the sickle bars.

6. In an agricultural mower, a mower arm, a pair of toothed sickle bars slidably mounted on said arm in superimposed cutting relation, means slidably supporting one of the bars, a separator element fastened to said arm and defining spaced channels loosely receiving the rear portions of said bars and supporting the rear portions of said bars in spaced relation, and a resilient hold-down arm fastened at one end to said mower arm with the other end slidably engaging the other of said bars to bias the teeth thereof into resilient cutting engagement with the teeth of the one bar.

References Cited in the file of this patent

UNITED STATES PATENTS

| | | |
|---|---|---|
| 1,191,147 | Bjering | July 18, 1916 |
| 2,458,200 | Renfroe et al. | Jan. 4, 1949 |

FOREIGN PATENTS

| | | |
|---|---|---|
| 681,597 | Germany | Sept. 29, 1939 |